June 29, 1948.                    W. KOHLHAGEN                    2,444,164
                              SYNCHRONOUS ELECTRIC MOTOR
Filed April 26, 1947                                          2 Sheets-Sheet 1
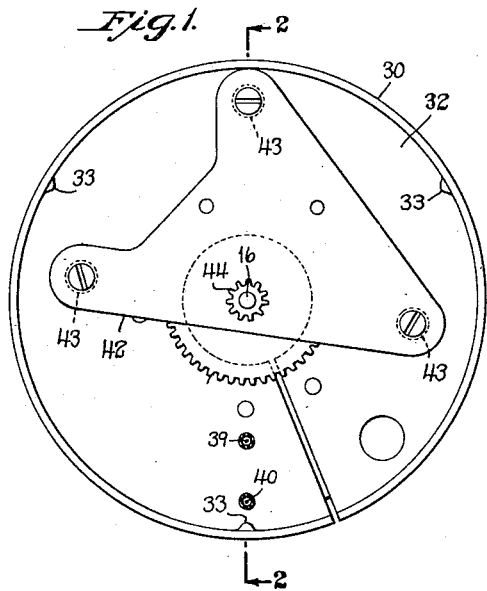
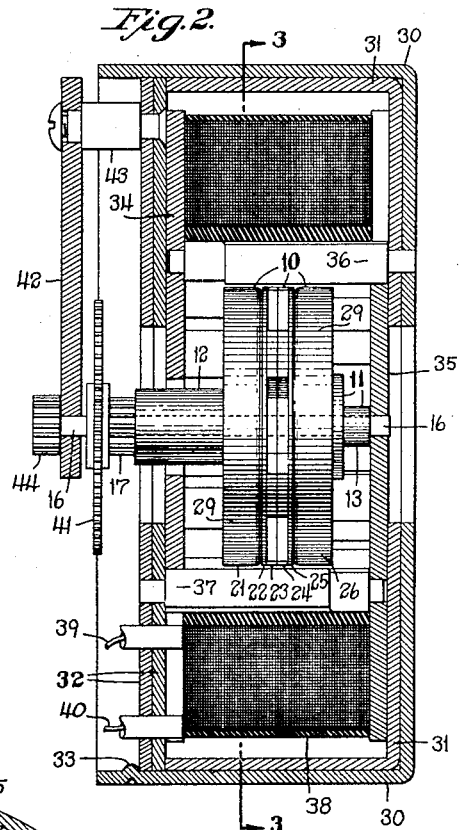
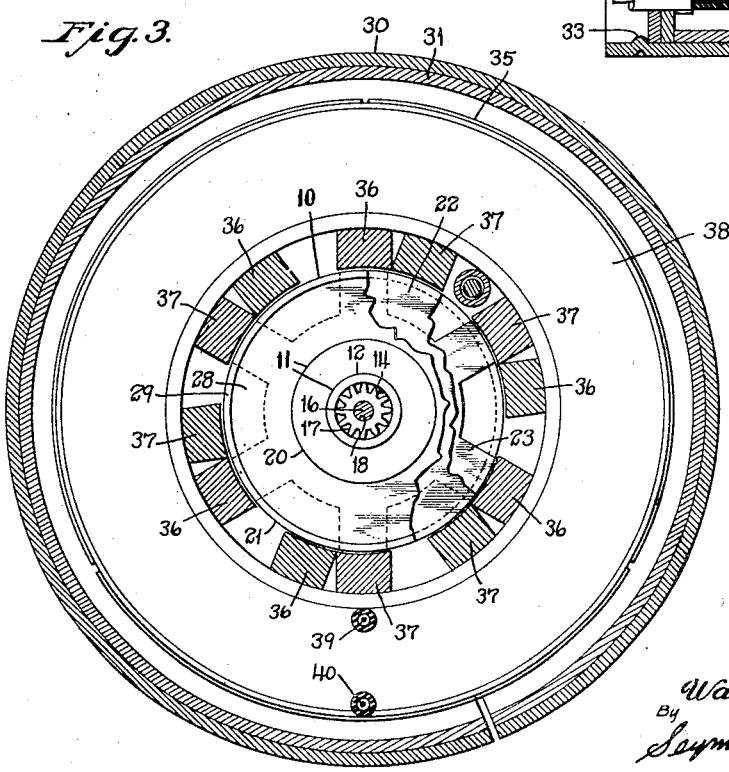
Inventor
Walter Kohlhagen
By Seymour, Earle & Nichols
Attorneys June 29, 1948. W. KOHLHAGEN 2,444,164
SYNCHRONOUS ELECTRIC MOTOR
Filed April 26, 1947 2 Sheets-Sheet 2
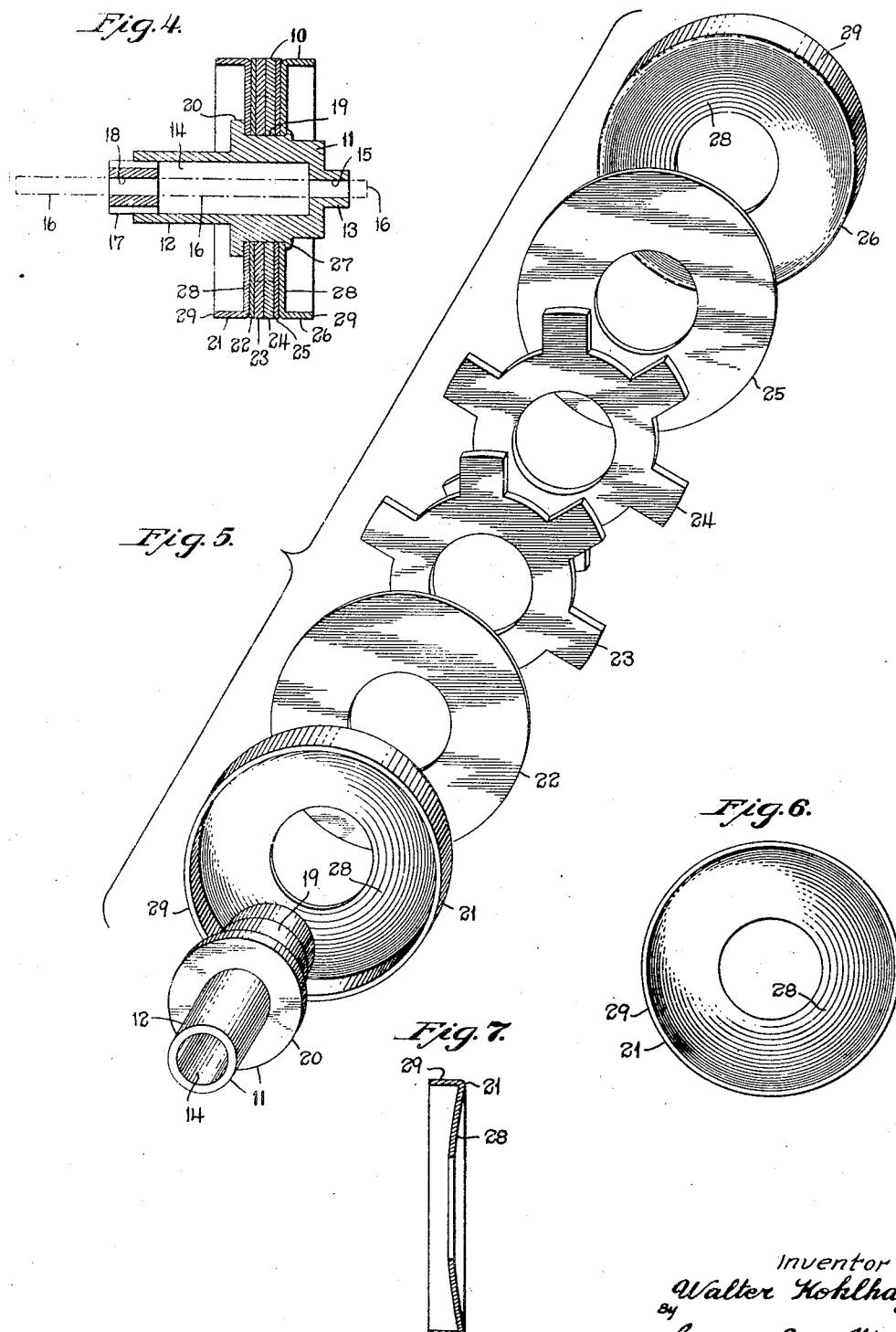
Inventor
Walter Kohlhagen
By
Seymour, Carter Nichols
Attorneys Patented June 29, 1948

2,444,164

UNITED STATES PATENT OFFICE 2,444,164

SYNCHRONOUS ELECTRIC MOTOR

Walter Kohlhagen, Elgin, Ill., assignor to The E. Ingraham Company, Bristol, Conn., a corporation of Connecticut Application April 26, 1947, Serial No. 744,121

3 Claims. (Cl. 172—278)

The present invention relates to improvements in synchronous electric motors of the type employing compound rotor-units having one or more permanent-magnet elements (high hysteresis) and one or more elements of markedly lesser permanent-magnet characteristics (low hysteresis) with both of the said types of elements operating as a unit in the same magnetic field.

A typical synchronous electric motor of the general character above referred to is shown in U. S. Patent No. 2,171,987 dated September 5, 1939.

I have discovered that by means of a very simple and inexpensive expedient both the synchronous torque and the self-starting torque of a synchronous electric motor of the character above referred to, may be very materially increased without increasing the density of the magnetic-flux which is required to be applied to the compound rotor-unit.

One of the main objects of the present invention is to provide a synchronous electric motor of the type above referred to in which there is a greater torque output from a given strength of magnetic field.

With the above and other objects in view, as will appear to those skilled in the art from the present disclosure, this invention includes all features in the said disclosure which are novel over the prior art.

In the accompanying drawings, in which certain modes of carrying out the present invention are shown for illustrative purposes:

Fig. 1 is a face view of one form which a synchronous electric motor may assume in accordance with the present invention;

Fig. 2 is a central sectional view taken on the line 2—2 of Fig. 1 on a larger scale and with the rotor-unit and associated parts in elevation;

Fig. 3 is a transverse sectional view taken on the line 3—3 of Fig. 2 but with the energizing-coil and rotor-unit in elevation;

Fig. 4 is a view in central longitudinal section of the rotor-unit;

Fig. 5 is an exploded perspective view of the elements of the rotor-unit illustrated in Figs. 2, 3 and 4;

Fig. 6 is an elevational view of one of the two cup-shaped rotor-elements; and

Fig. 7 is a central transverse sectional view thereof.

The compound rotor-unit

The compound rotor-unit chosen for purposes of illustrating a preferred form of the present invention is generally designated by the reference character 10 in the accompanying drawings, and is composed of a plurality of elements, as will be presently described.

The rotor-unit 10 above referred to includes a hub generally designated by the reference character 11 and which may be conveniently formed of aluminum, brass, or other suitable material. The said hub 11 includes a forwardly-projecting sleeve-portion 12 and a contracted rear bearing-portion 13.

Within the hub 11, including its sleeve 12, is an axial passage 14 of relatively-large diameter and opening through the forward end of the said sleeve 12. The contracted bearing-portion 13 is formed with an axial bearing-passage 15 of greatly-less diameter than the diameter of the axial passage 14. The bearing-passage 15 receives with a free turning fit the rear portion of a center-arbor 16 which itself is mounted for turning movement in a manner as will hereinafter appear.

Force-fitted into the open forward end of the sleeve 12 of the hub 11 is the rear portion of a drive-pinion 17 having an axial bearing-passage 18 therethrough which receives the adjacent portion of the center-arbor 16 with a free turning fit. The bearing-passage 18 is in axial alignment with the bearing-passage 15 before referred to and, like the same, receives the center-arbor 16 with a free turning fit.

Upon its outer periphery and intermediate its respective opposite ends, the hub 11 is formed with a cylindrical surface 19 and with an annular stop-flange 20 located at the forward end of and projecting radially outwardly beyond the cylindrical surface 19 just referred to.

Rigidly mounted upon the cylindrical portion 19 of the hub 11 is a front cup-shaped rotor-element 21, a front guard-disk 22, a front toothed rotor-element 23 of disk-like form, a companion rear toothed rotor-element 24, a rear guard-disk 25 and a rear cup-shaped rotor-element 26. All of the features 21 to 26 inclusive just referred to are rigidly clamped between the stop-flange 20 and a staked-over portion 27 of the hub 11.

The cup-shaped rotor-elements 21 and 26 are formed of permanent-magnet material such, for instance, as steel which has been heat-treated to harden it, cobalt-steel, or the like. The said cup-shaped rotor-elements 21 and 26 face in opposition to each other and each includes a radially-extending wall-portion 28 and a flange-like peripheral portion 29. The peripheral-portions 29—29 of the respective cup-shaped rotor-elements 21 and 26 extend away from each other and preferably have exterior diameters corresponding to the diameters of the guard-disks 22 and 25 and of the toothed rotor-elements 23 and 24.

The guard-disks 22 and 25 may be formed of any suitable non-magnetic materials such, for instance, as aluminum or brass. The disk-like toothed rotor-elements 23 and 24 are formed of material having low hysteresis such, for instance, as soft iron or silicon steel.

The wall-portion 28 of each of the cup-shaped rotor-elements 21 and 26 is initially concavo-convex, as is indicated in Figs. 6 and 7, in such manner that the concave face is faced away from the flange-like peripheral-portion 29 of a given rotor-element. When assembled with the other elements upon the hub 11, axial pressure is applied to substantially straighten out the respective wall-portions 28, as is indicated in Fig. 4, to thereby clamp the interposed elements tightly against vibration so as to thus avoid alternating-current hum in the rotor-assembly.

The stator structure

The particular stator structure chosen for illustration in the accompanying drawings includes an outer cup-shaped pole-unit 30, an inner cup-shaped pole-unit 31 fitting within the pole-unit 30, and a laminated plate-like pole-unit generally designated by the reference character 32. The inner cup-shaped pole-unit 31 is of less depth than the outer cup-shaped pole-unit 30, so that the laminated plate-like pole-unit 32 may fit within the said outer pole-unit 30 against the front edge of the companion inner cup-shaped pole-unit 31, all as is indicated in Fig. 2. For the purpose of rigidly holding the plate-like pole-unit 32 in place, the forward portion of the lateral wall of the outer cup-shaped pole-unit 30 is indented to provide a plurality of retaining-lugs 33 which press against the forward face of the pole-unit 32, as may be seen by reference to Figs. 1 and 2.

Located against the rear face of the laminated plate-like pole-unit 32 is a front shading-plate 34 and similarly located against the forward face of the bottom wall of the inner cup-shaped pole-unit 31 is a rear shading-plate 35. Both of the said shading-plates 34 and 35 are formed of low-resistance material such, for instance, as copper, and require no detailed description herein other than to state that they affect certain salient-poles to cause a lag in the flow of magnetic-flux therethrough in a manner well understood in the art and as is clearly set forth in U. S. Patent No. 2,171,987.

Projecting forwardly from the bottom walls of both of the cup-shaped pole-units 30 and 31 is a series of bar-like salient-poles 36, each of which has its front end entered into and stabilized by the front shading-plate 34, as is indicated in Fig. 2.

Projecting rearwardly from the plate-like pole-unit 32 is a series of bar-like salient-poles 37, each of which has its rear end extended into and stabilized by the rear shading-plate 35, as is indicated in Fig. 2.

All of the bar-like salient-poles 36 and 37 above referred to extend closely adjacent and across the entire periphery of the rotor-unit 10 and its elements 21 to 26 inclusive, as is indicated in Fig. 2.

Interposed in an axial direction between the shading-plates 34 and 35 and encircling the annular series of salient-poles 36 and 37 is an energizing-coil 38. The said energizing-coil is provided with a pair of leads 39 and 40 which are adapted to be connected to a source of alternating current such, for instance, as 60-cycle 110-volt alternating current, to magnetize the salient-poles 36 and 37 and thus cause the synchronous rotation of the rotor-unit 10. In the structure shown the salient-poles 36 and 37, in addition to applying a synchronous torque to the rotor-unit 10, also apply a self-starting torque thereto.

Rigidly mounted upon the center-arbor 16 at a point immediately forwardly of the drive-pinion 17 is a gear-wheel 41 which may be utilized as a portion of a clock gear-train.

Located forwardly of the plate-like pole-element 32 and also forwardly of the gear-wheel 41 is a bearing-plate 42 held in spaced relationship with respect to the pole-unit 32 by means of three (more or less) studs 43. The forward portion of the center-arbor 16 extends through and bears in the bearing-plate 42 in the manner indicated in Fig. 2, and has rigidly attached to its extreme forward end in front of the bearing-plate 42, a pinion 44. The rear end of the center-arbor 16 rotates in the central portion of the rear shading-plate 35.

As before noted, both of the cup-shaped rotor-elements 21 and 26 are formed of permanent-magnet material and are thus capable of retaining magnetic spottings upon their peripheral portions 29 with a magnetic spot of one polarity substantially diametrically opposite a magnetic spot of opposite polarity. A given diametrical portion of the wall 28 of each rotor-element 21 and 26 thus forms part of and adds to the strength of a double-pole permanent magnet.

Thus, permanent-magnet flux will flow through the wall-portions 28 of the said members and due to the presence of the guard-disks 22, such flux will not be short-circuited through the highly-permeable toothed rotor-elements 23 and 24 to such an extent as to materially weaken the effect of such permanent-magnet flux.

By means of the construction and arrangement of parts shown and described, it has been found possible to increase both the self-starting and the synchronous torques of the motor-structure over prior constructions without, however, increasing the magnetic density in the salient-poles 36 and 37.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. A synchronous electric motor, including in combination: a rotor-unit comprising a cup-shaped rotor-element having a radially-extending end wall and a circumferentially-continuous cylindrical flange extending therefrom away from the hereinafter-mentioned second rotor-element, the said cup-shaped rotor-element being formed of high-hysteresis and high-retentivity permanent-magnet material, a second rotor-element extending in parallelism with the end wall of the said cup-shaped rotor-element and formed of magnetic material of markedly-lower hysteresis and markedly-lower retentivity as compared to the said first rotor-element and spaced from the latter in an axial direction, and a guard-disk formed of nonmagnetic material and interposed between the two said rotor-elements; a stator-structure formed of low-hysteresis magnetic material and having a plurality of pole-salients respectively of different instantaneous polarities and each extending adjacent but spaced by an airgap from the respective peripheries of both of the said rotor-elements to simultaneously subject the same to the action of magnetic-flux; the thickness of the said guard-member being in excess of fifty per cent of the air-gap between the pole-salients of the said stator-structure and the periphery of the said cup-shaped rotor-element; and an energizing-coil designed for connection to a source of alternating current and located adjacent the said stator-structure to magnetize the same; whereby the permanent magnetic-flux of the said cup-shaped rotor-element is guarded by the said nonmagnetic guard-member against being materially short-circuited by the said low-hysteresis second rotor-element.

2. A synchronous electric motor, including in combination: a rotor-unit comprising two cup-shaped rotor-elements both formed of high-hysteresis and high-retentivity permanent-magnet material, each of the cup-shaped rotor-elements having an end wall spaced in an axial direction from the end wall of the other cup-shaped rotor-element, each of the said cup-shaped rotor-elements also having a cylindrical flange extending in a direction away from the similar flange of the other cup-shaped rotor-element; a disk-like rotor-element located between and extending in parallelism with the respective end walls of the two said cup-shaped rotor-elements and formed of magnetic material of markedly-lower hysteresis and markedly-lower retentivity as compared to the said cup-shaped rotor-elements, and a pair of guard-disks formed of nonmagnetic material and respectively interposed between the said disk-like rotor-element and the respective end walls of the said cup-shaped rotor-elements; a stator-structure formed of low-hysteresis magnetic material and having a plurality of pole-salients respectively of different instantaneous polarities and each extending adjacent but spaced by an airgap from the respective peripheries of all of the aforesaid rotor-elements to simultaneously subject the same to the action of magnetic-flux; the thickness of each of the said pair of guard-members being in excess of fifty per cent of the airgap between the pole-salients of the said stator-structure and the respective peripheries of the said cup-shaped rotor-elements; and an energizing-coil designed for connection to a source of alternating current and located adjacent the said stator-structure to magnetize the same; whereby the permanent magnetic-flux of both of the said cup-shaped rotor-elements is guarded by the said nonmagnetic guard-members against being materially short-circuited by the said low-hysteresis disk-like rotor-element.

3. A synchronous electric motor, including in combination: a rotor-unit comprising two cup-shaped rotor-elements both formed of high-hysteresis and high-retentivity permanent-magnet material, each of the said cup-shaped rotor-elements having an end wall concaved away from the similar end wall of the other cup-shaped rotor-element and spaced therefrom in an axial direction, each of the said cup-shaped rotor-elements also having a cylindrical flange extending in a direction away from the similar flange of the other cup-shaped rotor-element; a disk-like rotor-element located between and extending in parallelism with the respective end walls of the two said cup-shaped rotor-elements and formed of magnetic material of markedly-lower hysteresis and markedly-lower retentivity as compared to the said cup-shaped rotor-elements, a pair of guard-disks formed of nonmagnetic material and respectively interposed between the said disk-like rotor-element and the respective end walls of the said cup-shaped rotor-elements, and clamping-means extending in an axial direction through the said guard-disks and all of the aforesaid rotor-elements and applying a force tending to lessen the concavity of the respective end walls of the said cup-shaped rotor-elements and causing the latter to tightly clamp the said disk-like rotor-element and the said guard-disks between the two said cup-shaped rotor elements; a stator-structure formed of low-hysteresis magnetic material and having a plurality of pole-salients respectively of different instantaneous polarities and each extending adjacent but spaced by an airgap from the respective peripheries of all of the aforesaid rotor-elements to simultaneously subject the same to the action of magnetic-flux; the thickness of each of the said pair of guard-members being in excess of fifty per cent of the air gap between the pole-salients of the said stator-structure and the respective peripheries of the said cup-shaped rotor-elements; and an energizing-coil designed for connection to a source of alternating current and located adjacent the said stator-structure to magnetize the same; whereby the permanent magnetic-flux of both of the said cup-shaped rotor-elements is guarded by the said nonmagnetic guard-members against being materially short-circuited by the said low-hysteresis disk-like rotor-element.

WALTER KOHLHAGEN.

REFERENCES CITED

The following references are of record in the file of this patent:

UNITED STATES PATENTS

| Number | Name | Date |
| --- | --- | --- |
| 1,892,552 | Holtz | Dec. 27, 1932 |
| 2,171,987 | Poole | Sept. 5, 1939 |